US011561048B2

(12) United States Patent
Erno et al.

(10) Patent No.: US 11,561,048 B2
(45) Date of Patent: Jan. 24, 2023

(54) CIRCULAR CROSSFLOW HEAT EXCHANGER

(71) Applicant: General Electric Company, Schenectady, NY (US)

(72) Inventors: Daniel Jason Erno, Clifton Park, NY (US); William Dwight Gerstler, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 34 days.

(21) Appl. No.: 16/804,538

(22) Filed: Feb. 28, 2020

(65) Prior Publication Data
US 2021/0270534 A1    Sep. 2, 2021

(51) Int. Cl.
*F28F 7/02*    (2006.01)
*F28D 1/02*    (2006.01)
(Continued)

(52) U.S. Cl.
CPC ......... *F28D 7/0016* (2013.01); *F28D 7/0058* (2013.01); *F28D 7/1669* (2013.01);
(Continued)

(58) Field of Classification Search
CPC . F28D 7/02; F28D 7/024; F28D 7/026; F28D 1/047; F28D 1/0472; F28D 1/0473;
(Continued)

(56) References Cited

U.S. PATENT DOCUMENTS

| 5,159,976 A * | 11/1992 | Virtue ..................... F25B 39/04 |
| | | 165/144 |
| 6,973,965 B2* | 12/2005 | Meshenky .......... F02B 29/0462 |
| | | 165/125 |

(Continued)

FOREIGN PATENT DOCUMENTS

GB    1483425 A    8/1977

OTHER PUBLICATIONS

Bacellar, D., et al., Design optimization and validation of high-performance heat exchangers using approximation assisted optimization and additive manufacturing, Journal Science and Technology for the Built Environment, vol. 23, Issue: 6, 2017, pp. 896-911, Purdue University Refrigeration Conference, Heat and Mass Transfer.

(Continued)

*Primary Examiner* — Frantz F Jules
*Assistant Examiner* — Jason N Thompson
(74) *Attorney, Agent, or Firm* — Dority & Manning, P.A.

(57) ABSTRACT

A heat exchange module, a heat exchanger and a method for additively manufacturing the heat exchanger are provided. The heat exchanger includes a plurality of stacked heat exchange modules defining a flow passageway. Each heat exchange module defining a substantially curved closed geometry defining a central axis that extends along the axial direction. Each heat exchange module includes a first heat exchanging fluid inlet, a first heat exchanging fluid outlet and a plurality of heat exchange tubes fluidly coupling the (Continued)

first heat exchanging fluid inlet and the first heat exchanging fluid outlet. The plurality of heat exchange tubes defining a plurality of first heat exchanging fluid flow passages of equal length and a plurality of second heat exchanging fluid flow passages of equal hydraulic diameter.

24 Claims, 9 Drawing Sheets

(51) Int. Cl.
```
F28D 7/00      (2006.01)
F28D 7/04      (2006.01)
F28D 7/16      (2006.01)
F28D 1/047     (2006.01)
F28F 21/08     (2006.01)
B33Y 80/00     (2015.01)
```
(52) U.S. Cl.
CPC ............ *F28F 21/089* (2013.01); *B33Y 80/00* (2014.12); *F28F 2255/00* (2013.01)
(58) Field of Classification Search
CPC ........... F28D 2001/0273; F28D 7/0041; F28D 7/005; F28D 7/04; F28D 7/0058; F28D 7/1669; F28D 7/163; F28F 7/02
See application file for complete search history.

(56) References Cited

U.S. PATENT DOCUMENTS

| | | | |
|---|---|---|---|
| 7,810,552 B2 | 10/2010 | Slaughter | |
| 9,909,448 B2 | 3/2018 | Gerstlet et al. | |
| D818,093 S | 5/2018 | Erno et al. | |
| 9,976,815 B1* | 5/2018 | Roper | F28D 7/08 |
| 10,041,375 B2 | 8/2018 | Gerstler et al. | |
| 10,209,009 B2 | 2/2019 | Gerstler et al. | |
| 10,247,296 B2 | 4/2019 | Van Der Merwe et al. | |
| 10,365,047 B2 | 7/2019 | Lassini et al. | |
| 10,434,575 B2 | 10/2019 | Sabo et al. | |
| 2016/0202003 A1 | 7/2016 | Gerstler et al. | |
| 2016/0281532 A1* | 9/2016 | Rambo | F01D 25/12 |
| 2017/0248372 A1 | 8/2017 | Erno et al. | |
| 2017/0276440 A1* | 9/2017 | Kenworthy | F28F 1/32 |
| 2018/0283795 A1* | 10/2018 | Cerny | F28F 9/02 |
| 2018/0299066 A1 | 10/2018 | Erno et al. | |
| 2019/0003315 A1 | 1/2019 | Erno et al. | |
| 2019/0024987 A1* | 1/2019 | Moore | F28D 7/08 |
| 2019/0056178 A1* | 2/2019 | Veilleux, Jr. | F28D 9/02 |
| 2019/0178585 A1 | 6/2019 | De Bock et al. | |
| 2019/0186361 A1* | 6/2019 | Gerstler | F28D 9/04 |
| 2019/0285364 A1* | 9/2019 | Streeter | F28F 19/00 |
| 2019/0293364 A1 | 9/2019 | Stockton et al. | |
| 2020/0263928 A1* | 8/2020 | Joseph | F28D 1/0246 |
| 2020/0284518 A1* | 9/2020 | Becene | F28D 7/005 |
| 2021/0222966 A1* | 7/2021 | Meczkowski | F28F 1/025 |

OTHER PUBLICATIONS

Rathay, N. et al.; "Tip Rail With Cooling Structure Using Three Dimensional Unit Cells"; Pending U.S. Appl. No. 16/207,995, filed Nov. 30, 2009; 45 Pages.

Debock, H. et al.; "Inverted Heat Exchanger Device"; Pending U.S. Appl. No. 16/62,728, filed on Nov. 22, 2019; 46 pages.

* cited by examiner

CIRCULAR CROSSFLOW HEAT EXCHANGER

BACKGROUND OF THE DISCLOSURE

The present subject matter relates generally to heat exchangers, and more particularly, to a compact heat exchanger with improved heat transfer capability and structural rigidity.

BACKGROUND

Heat exchangers may be employed in conjunction with thermal management systems for transferring heat between one or more fluids. For example, a first fluid at a relatively high temperature may be passed through a first passageway, while a second fluid at a relatively low temperature may be passed through a second passageway. The first and second passageways may be in thermal contact or close proximity, allowing heat from the first fluid to be passed to the second fluid. Thus, the temperature of the first fluid may be decreased and the temperature of the second fluid may be increased.

Conventional heat exchangers include a large number of fluid passageways, each fluid passageway being formed using some combination of plates, bars, foils, fins, manifolds, support structures, mounting flanges, etc. Each of these parts must be individually positioned, oriented, and connected to the supporting structure, e.g., via brazing, welding, or another joining method. The manufacturing time and costs associated with the assembly of such a heat exchanger are very high and the likelihood of fluid leaks between the fluid passageways or from the heat exchanger in general is increased due to the number of joints formed. In addition, manufacturing restrictions limit the number, size, and configuration of heat exchanger features and structural components that may be included in the heat exchanger, e.g., within the fluid passageways.

Accordingly, a thermal management system with an improved heat exchanger would be useful. More specifically, a heat exchanger for a thermal management system that is easier to manufacture, is compact and includes features for improved thermal and structural performance would be particularly beneficial.

BRIEF DESCRIPTION

Aspects and advantages of the disclosure will be set forth in part in the following description, or may be obvious from the description, or may be learned through practice of the disclosure.

In one exemplary embodiment of the present disclosure, a heat exchange module is provided. The heat exchange module includes a first heat exchanging fluid inlet, a first heat exchanging fluid outlet, and a plurality of heat exchange tubes fluidly coupling the first heat exchanging fluid inlet and the first heat exchanging fluid outlet. The plurality of heat exchange tubes defining a plurality of first heat exchanging fluid flow passages of equal length and a plurality of second heat exchanging fluid flow passages of equal hydraulic diameter. The heat exchange module defines a curved closed geometry defining a central axis that extends along the axial direction.

In another exemplary aspect of the present disclosure, a heat exchanger defining an axial direction, a radial direction, and a circumferential direction is provided. The heat exchanger includes a plurality of heat exchange modules stacked along the axial direction to define a flow passageway. Each of the plurality of heat exchange modules has a substantially curved closed geometry defining a central axis that extends along the axial direction. Each of the plurality of heat exchange modules includes a first heat exchanging fluid inlet, a first heat exchanging fluid outlet, and a plurality of heat exchange tubes fluidly coupling the first heat exchanging fluid inlet and the first heat exchanging fluid outlet. The plurality of heat exchange tubes define a plurality of first heat exchanging fluid flow passages of equal length and a plurality of second heat exchanging fluid flow passages of equal hydraulic diameter.

In still another exemplary aspect of the present disclosure, a method of manufacturing a heat exchanger is provided. The method includes depositing a layer of additive material on a bed of an additive manufacturing machine and selectively directing energy from an energy source onto the layer of additive material to fuse a portion of the additive material and form the heat exchanger defining an axial direction, a radial direction, and a circumferential direction. The heat exchanger including a plurality of heat exchange modules stacked along the axial direction to define a flow passageway. Each of the plurality of heat exchange modules has a substantially curved closed geometry defining a central axis that extends along the axial direction. Each of the plurality of heat exchange modules includes a first heat exchanging fluid inlet, a first heat exchanging fluid outlet, and a plurality of heat exchange tubes fluidly coupling the first heat exchanging fluid inlet and the first heat exchanging fluid outlet. The plurality of heat exchange tubes defining a plurality of first heat exchanging fluid flow passages of equal length and a plurality of second heat exchanging fluid flow passages of equal hydraulic diameter.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
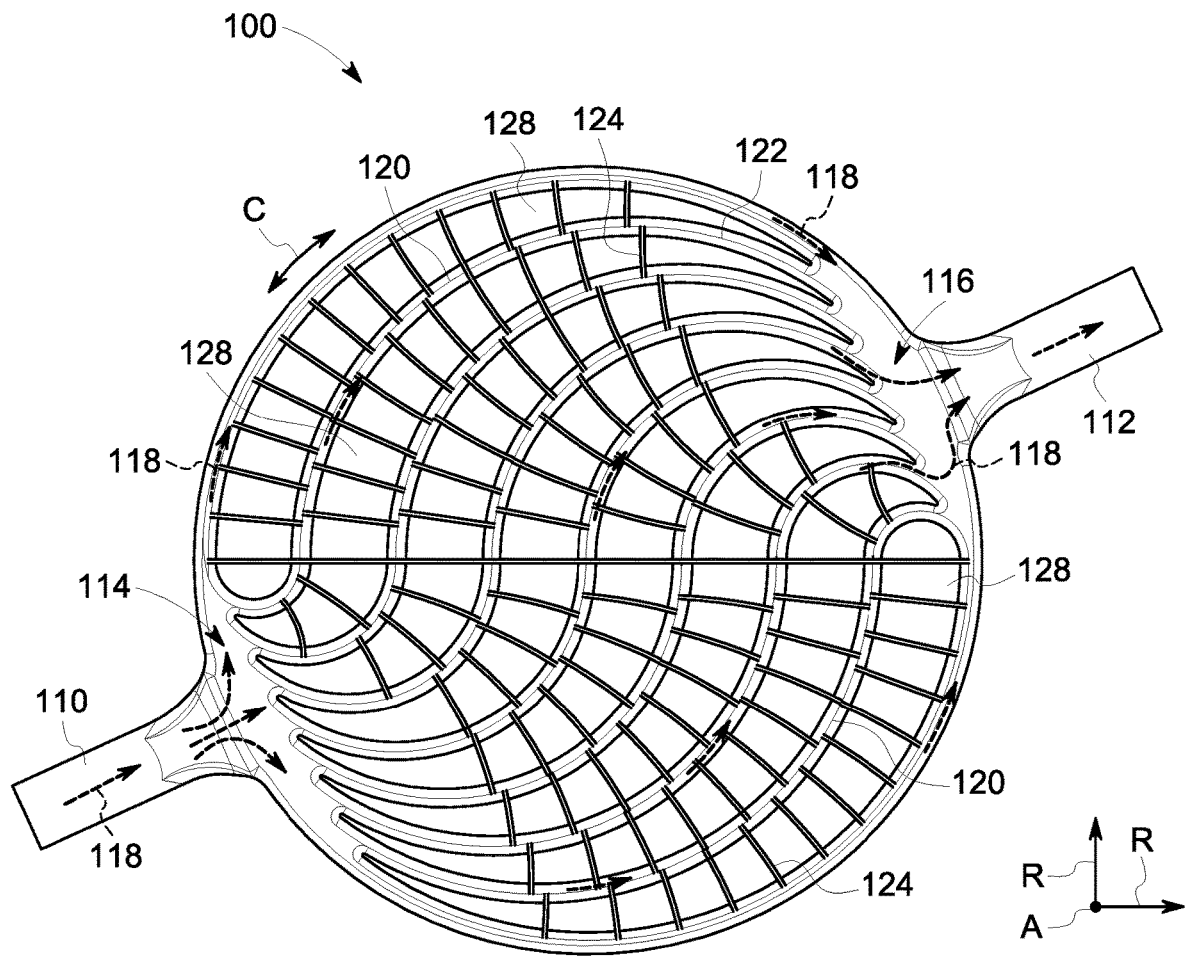
FIG. 1 provides a top view of a heat exchange module, in accordance with one embodiment of the present disclosure.

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure. As used herein, the terms "first", "second", and "third" may be used interchangeably to distinguish one component from another and are not intended to signify location or importance of the individual components. The terms "forward" and "aft" refer to relative positions within a thermal management system, with forward referring to a position closer to component inlet and aft referring to a position closer to a component exhaust. The terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

As used herein, a "fluid" may be a gas or a liquid. The present approach is not limited by the types of fluids that are used. In the preferred application, the cooling fluid is air, and the cooled fluid is oil. The present approach may be used for other types of liquid and gaseous fluids, where the cooled fluid and the cooling fluid are the same fluids or different fluids. Other examples of the cooled fluid and the cooling fluid include fuel, hydraulic fluid, combustion gas, refrigerant, refrigerant mixtures, dielectric fluid for cooling avionics or other aircraft electronic systems, water, water-based compounds, water mixed with antifreeze additives (e.g., alcohol or glycol compounds), and any other organic or inorganic heat transfer fluid or fluid blends capable of persistent heat transport at elevated or reduced temperature.

The present disclosure is generally directed to a heat exchanger comprised of a plurality of heat exchange modules and a method for additively manufacturing the heat exchanger. The heat exchanger includes one or more heat exchange modules having a substantially curved closed geometry, forming a heat exchanger. The heat exchanger includes a plurality of heat exchange modules, they are configured in a stacked formation. The heat exchanger provides a constant flow path and hydraulic diameter of the flow passages for each of the two fluids, and more particularly the cooled fluid and the cooling fluid, passing therethrough. The design as disclosed provides a more compact and efficient heat exchanger capable of being disposed within a conduit or pipe.

Each heat exchange module includes a plurality of heat exchange tubes that form a flow path for a flow of the cooled fluid (high density fluid) that extends from a fluid inlet to a fluid outlet and defines a flow path for the cooling fluid in a cross-flow configuration. The cooled fluid inlet and outlet fluidly couple the heat exchange tubes of adjacent heat exchange modules in a manner to form a flow path for the flow of the cooled fluid and a flow path for the cross-flow fluid flow.

Disclosed is an additively manufactured heat exchange module described according to exemplary embodiments of the present subject matter. The heat exchange modules may be used to transfer heat between two or more fluids in any suitable application. For example, the heat exchange modules may be configured for transferring heat from oil to air or between two streams of air within a gas turbine engine. However, it should be appreciated that the heat exchange modules can be configured for receiving any suitable number and type of fluids for use in the heat transfer process, examples of which are described herein. In addition, the concepts and heat exchanging structures disclosed herein could be similarly used in automotive, aviation, maritime, and other industries to assist in heat transfer between fluids. Moreover, the figures illustrate embodiments of the heat exchange module for the purpose of explaining its general operation, but the size, shape, and configuration of the heat exchange modules is not intended to limit the scope of the present subject matter. For example, the size, shape, number, and configuration of fluid passageways may be varied in a manner that maintains the described hydraulic diameter and constant flow path, while remaining within the scope of the present subject matter.

In general, the exemplary embodiments of the heat exchange modules and heat exchanger described herein may be manufactured or formed using any suitable process. However, in accordance with several aspects of the present subject matter, the heat exchange modules may be formed using an additive-manufacturing process, such as a 3-D printing process. The use of such a process may allow the heat exchange modules to be formed integrally, as a single monolithic component, or as any suitable number of sub-components or modules to form the heat exchanger. In particular, the manufacturing process may allow the heat exchange modules to be integrally formed and include a variety of features not possible when using prior manufacturing methods. For example, the additive manufacturing methods described herein enable the manufacture of heat exchangers having various features, configurations, thicknesses, materials, densities, fluid passageways, and mounting structures not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways with integral collector manifolds. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved heat transfer efficiency and reliability.

Figure 2:
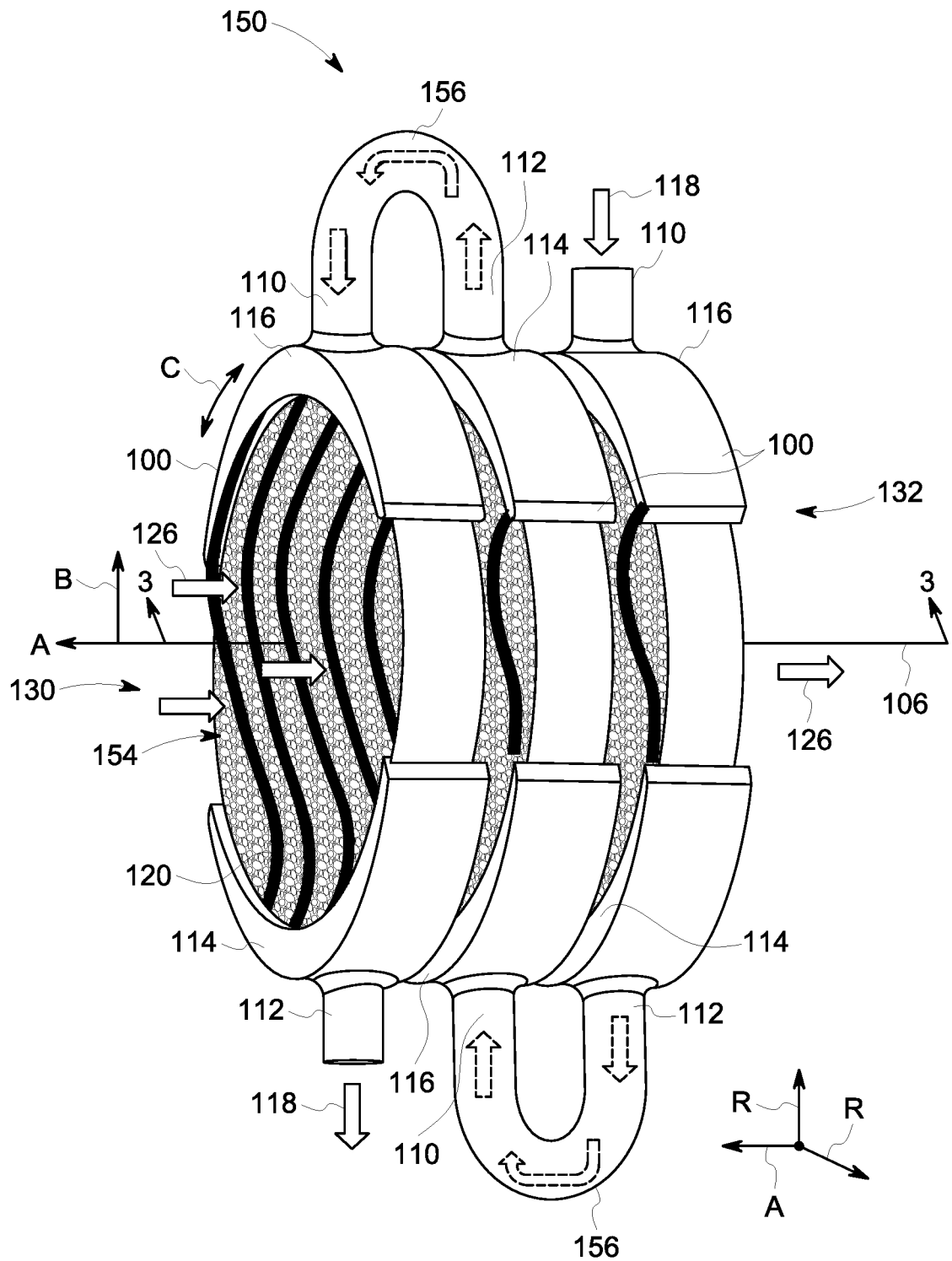
FIG. 2 provides an isometric view of a plurality of heat exchange modules of FIG. 1, in a stacked configuration to form a heat exchanger, in accordance with one embodiment of the present disclosure.
Figure 3:
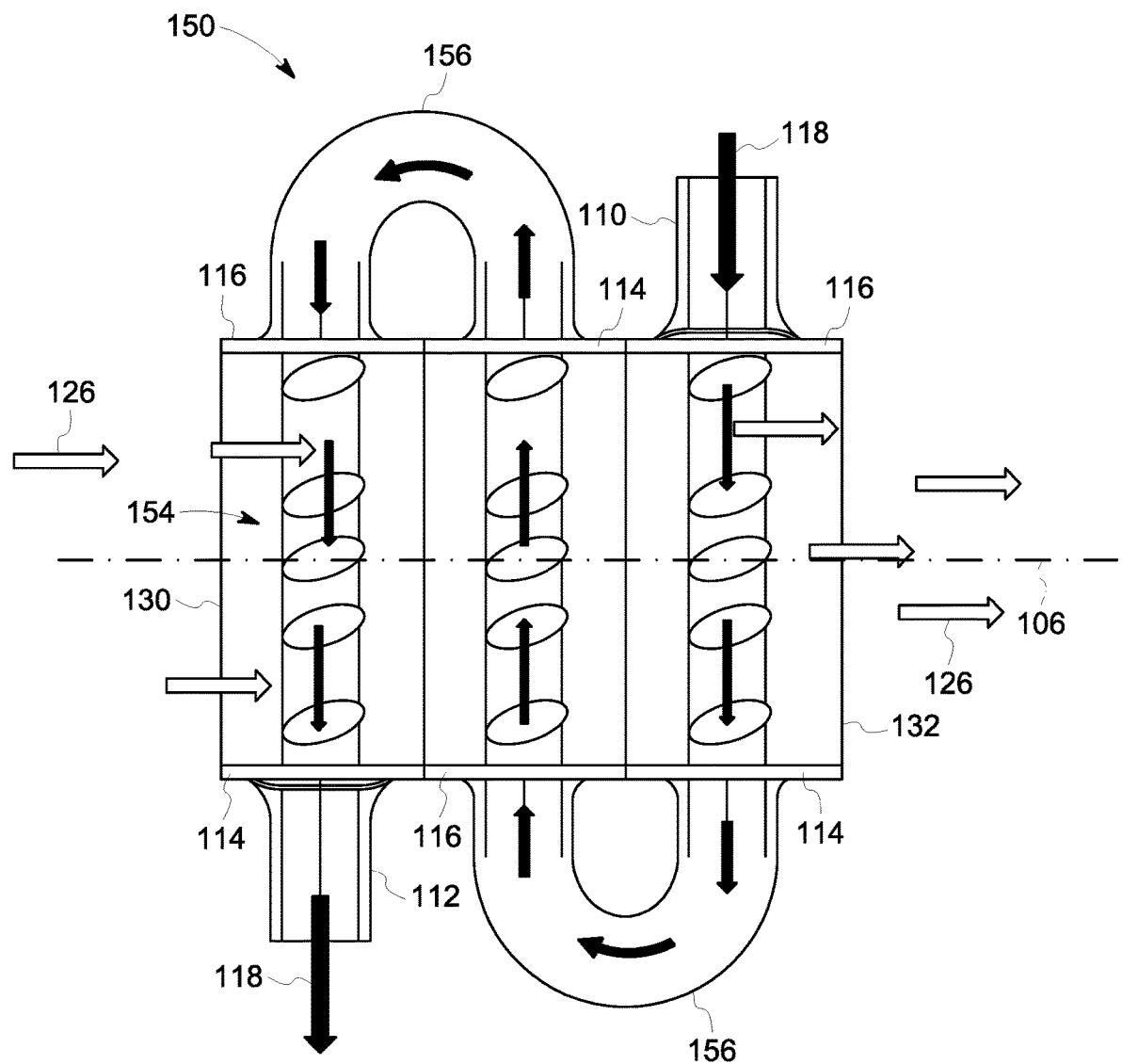
FIG. 3 illustrates an enlarged and partial, cross-sectional view of the heat exchanger of FIG. 2, in accordance with one embodiment of the present disclosure.
Figure 4:
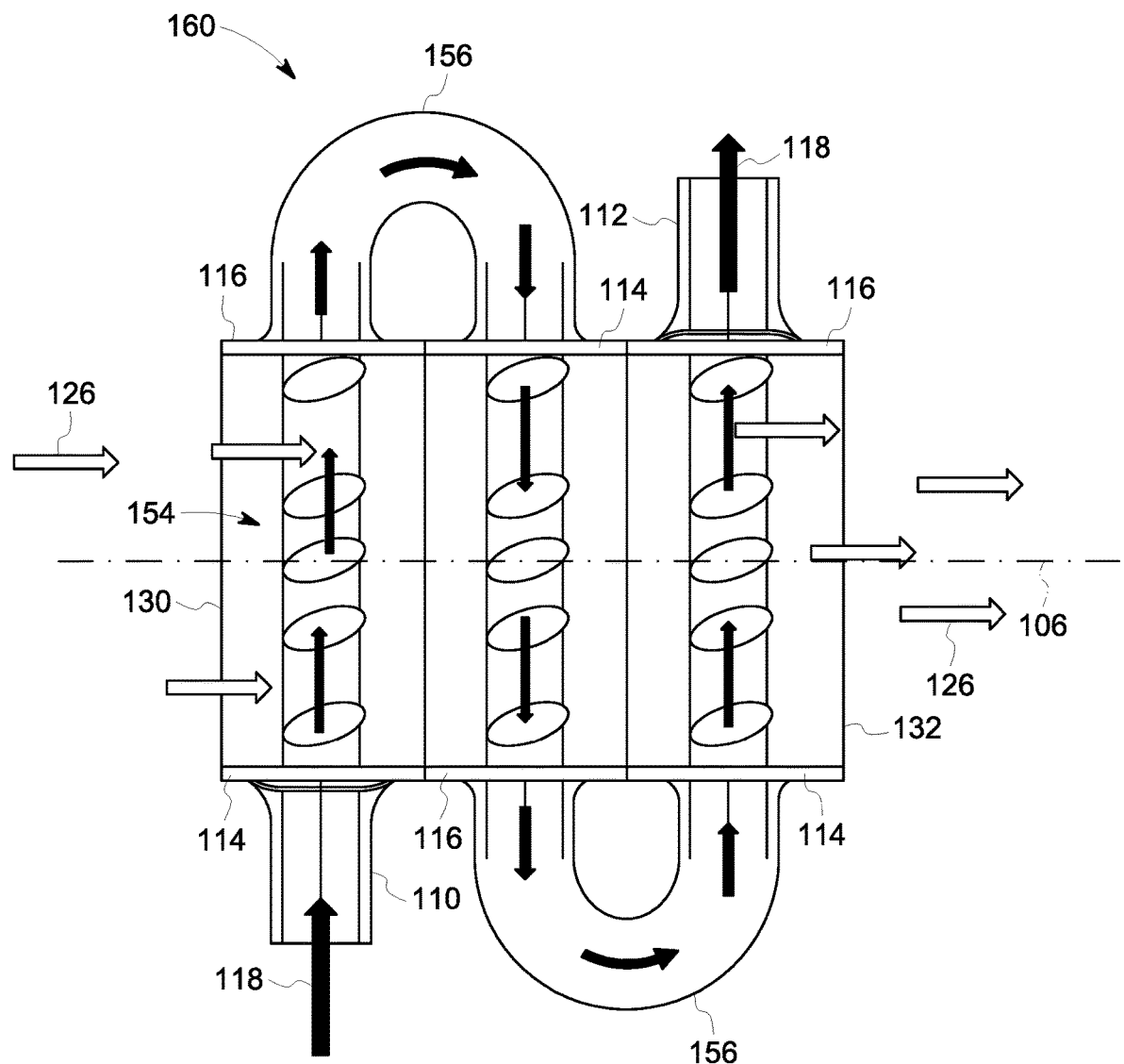
FIG. 4 illustrates an enlarged and partial, cross-sectional view of a fluid flow in another embodiment of a heat exchanger, in accordance with one embodiment of the present disclosure.

Referring to FIGS. 1-4, a heat exchange module 100 will be described according to a first embodiment of the present subject matter. In this regard, FIG. 1 provides a front view of the heat exchange module 100. FIG. 2 illustrates a plurality of the heat exchange modules 100 of FIG. 1, assembled in stacked configuration to form a heat exchanger 150. FIG. 3 illustrates an enlarged cross-sectional view of the heat exchanger of FIG. 2, taken through line 3-3 of FIG. 2. FIG. 4 illustrates a fluid flow in a sectional view of an alternate embodiment of the heat exchanger. As illustrated, the heat exchange module 100 generally defines an axial direction A, a radial direction R, and a circumferential direction C. Likewise, the heat exchanger 150 generally defines an axial direction A, a radial direction R, and a circumferential direction C. According to the illustrated embodiment, the heat exchange module 100 and the heat exchanger 150, generally define a flow passageway 154, as best illustrated in FIGS. 2 and 3, extending along the axial direction A. According to the illustrated embodiment, each of the one or more heat exchange modules 100 defines a substantially curved closed geometry, and more particularly, a circular cross-section defining a central axis 106 (FIG. 2) that extends along the axial direction A. In this manner, the flow passageway 154 is an elongated cylinder and provides the heat exchanger 150 to fit, for example, within or replace and existing pipe or circular conduit to facilitate a heat exchange process. However, it should be appreciated that according to alternative embodiments, the heat exchange module 100 may have any substantially curved closed geometry such as an ellipse, oval, Reuleaux or other curve-linear triangle, etc. For example, the heat exchange module 100 may have a non-circular cross section and may have a curved central axis 106 such that the heat exchange module 100 can fit in non-linear flow paths or conduits.

Heat exchanger 150 includes a plurality of heat exchange modules 100 in a stacked configuration to define the flow passageway 154 along the central axis 106, i.e., the axial direction A in the illustrated embodiment. Each heat exchange module 100 includes a first heat exchanging fluid inlet 110, that when in a stacked formation to form the heat exchanger 150, is in fluid communication with an adjacent upstream heat exchange module 100 or a source of heat exchanging fluid (not shown). In addition, each heat exchange module 100 includes a first heat exchanging fluid outlet 112, that when in a stacked formation to form the heat exchanger 150, is in fluid communication with an adjacent downstream heat exchange module 100 or serves as a discharge. Each first heat exchanging fluid inlet 110 is in fluid communication with an inlet manifold 114, having a generally arc-shape of a circle. Similarly, each first heat exchanging fluid outlet 112 is in fluid communication with an outlet manifold 116, having a generally arc-shape of a circle. A plurality of heat exchange tubes 120 extend between the inlet manifold 114 and the outlet manifold 116. In this particular embodiment, each of the plurality of heat exchange tubes 120 is generally "S" shaped such that the length of each of the plurality of heat exchange tubes 120 in a single heat exchange module 100 are equal.

During operation, a first heat exchanging fluid flow 118 enters the inlet manifold 114 in an arc shape and is distributed to the plurality of heat exchange tubes 120. The plurality of heat exchange tubes 120 are fluidly coupled to the arc shaped outlet manifold 116 that is on the opposite side of the circular shaped heat exchange module 100. In an embodiment, a first heat exchanging fluid flow passage 122 defined within each of the plurality of heat exchange tubes 120 can be configured as a single flow passage, or include multiple flow passages or other shapes internal to the "S" shape. A plurality of extended surface fins 124 may be included in the design, spanning between the plurality of "S" shaped heat exchange tubes 120, and defining a plurality of second heat exchanging fluid flow passages 128 for passage therethrough of a second heat exchanging fluid flow 126. The spacing and shape of the plurality of extended surface fins 124 are such that the second heat exchanging fluid flow 126, such as air, passing through the heat exchange module 100 in a cross-flow direction to the first heat exchanging fluid flow 118, has the same hydraulic diameter in each of the plurality of second heat exchanging fluid flow passages 128 defined by the fins 124.

To increase the surface area of the plurality of extended surface fins 124 and thereby increase the thermal transfer capability, each of the plurality of extended surface fins 124 may be angled or curved with respect to the plurality of heat exchange tubes 120. The plurality of extended surface fins 124 which define the plurality of second heat exchanging fluid flow passages 128 for the second heat exchanging fluid flow 126 may be curved so that they comprise a variable angle with a curved surface or they can be configured to be straight and formed at an acute or obtuse angle to the heat exchange tubes 120. In selecting any single fin 124, it will be seen that on one side of the fin an acute angle is formed with the heat exchange tubes 120 and the supplementary angle (on the opposing side) is an obtuse angle. Fin configurations as shown in FIG. 1 increase the length (and surface area) of the fins, and the fins may be angled/curved in opposing directions as well, and in a manner that provide for equal hydraulic diameter in each second heat exchanging fluid flow passage 128 defined by the plurality of extended surface fins 124.

The plurality of extended surface fins 124 may be about 0.006 inches thick or less. The plurality of extended surface fins 124 can be thinner because they do not have to be leak free. The fluid on the other side of the fin surface will be from the same fluid stream (second heat exchanging fluid flow 126), as it will be approximately the same temperature and pressure, thus there will be no driving force to move the fluid between fins.

In combination, the equal length of the plurality of "S" shaped heat exchange tubes 120 and spacing and shape of the plurality of extended surface fins 124 provide for the maintenance of a constant flow path and hydraulic diameter for each of the first heat exchanging fluid flow 118 and the second heat exchanging fluid flow 126. This enables a more compact and efficient design.

Referring briefly to FIGS. 2 and 3, as shown, the heat exchanger 150 comprises a plurality of heat exchange modules 100 stacked adjacent each other. In addition, the heat exchanger 150 defines a plurality of outer manifolds 156, with each outer manifold 156 coupling adjacent heat exchange modules 100, e.g., to steer the first heat exchanging fluid flow 118 back into the plurality of heat exchange tubes 120. More specifically, each of the plurality of outer manifolds 156 is configured to bridge two adjacent heat exchange modules 100, via fluidic coupling to the first heat exchanging fluid inlet 110 and the first heat exchanging fluid outlet 112 of the two adjacent heat exchange modules 100, respectively, to provide fluid communication between the two adjacent heat exchange modules 100.

As illustrated, the heat exchange modules 100 extend through flow passageway 154 substantially along the radial direction R and axial direction A, when stacked adjacent to each other and fluidly coupled using the plurality of outer manifolds 156. In this manner, the first heat exchanging fluid flow 118 within each of the heat exchange modules 100 will flow through the plurality of heat exchange tubes 120 of each heat exchange module 100 in the heat exchanger 150.

The heat exchange modules 100 are positioned within the flow passageway 154 such that they are fluidly isolated from the flow passageway 154 but in thermal communication with the second heat exchanging fluid flow 126 flowing therein. The upstream-most, or the first heat exchange module 100 of the heat exchanger 150, is referred to herein as an inlet heat exchange module, and the downstream-most heat exchange module 100 of the heat exchanger 150 is referred to herein as a discharge heat exchange module. The first heat exchanging fluid flow 118 may flow through the first heat exchanging fluid inlet 110 of the inlet heat exchange module 100 and pass through the heat exchange modules 100 along the axial direction A until passing through the first heat exchanging fluid outlet 112 of the discharge heat exchange module.

In addition, according to an exemplary embodiment, the heat exchanger 150, and more particularly the heat exchange modules 100, define a second heat exchanging fluid inlet 130 and a second heat exchanging fluid outlet 132. As illustrated, the second heat exchanging fluid inlet 130 provides for the second heat exchanging fluid flow 126 to the inlet heat exchange module 100. The second heat exchanging fluid flow 126 passes through the heat exchange modules 100 before exiting the heat exchanger 150 through the discharge heat exchange module 100 and the second heat exchanging fluid outlet 132. Any suitable number of heat exchange modules 100 may be stacked along the central axis 106 and the second heat exchanging fluid inlet 130 and the second heat exchanging fluid outlet 132 may be spaced apart along the axial direction A to supply and receive the second heat exchanging fluid flow 126.

The heat exchange module 100 is described herein as passing the first heat exchanging fluid flow 118 substantially along the radial direction R and the second heat exchanging fluid flow 126 substantially along the axial direction A (i.e., perpendicular to the radial direction R). In this manner, the heat exchange module 100 is configured such that the flows are perpendicular to each other and in a cross-flow heat exchange arrangement. As described in detail above, any suitable alternative heat exchanging fluids may be used.

Additionally, each successive heat exchange module 100 may be clocked to steer and/or provide interruption of the second heat exchanging fluid flow 126 along the axial direction A through the flow passageway 154. Such a configuration might improve heat transfer at the cost of sink-side pressure drop. By contrast, according to still another embodiment, the heat exchange modules 100 may be uniformly oriented along the axial direction A, e.g., to reduce flow losses and pressure drop within flow passageway 154.

In an alternate embodiment of the heat exchanger, generally referenced 160, as illustrated in FIG. 4, one of the relative fluid directions of the first heat exchanging fluid flow 118 or the second heat exchanging fluid flow 126 can be reversed from that illustrated in FIG. 3, resulting in a different flow configuration that is of use. This type of flow configuration results in a co-flow heat exchanger as illustrated in FIG. 4, wherein the first heat exchanging fluid flow 118 or the second heat exchanging fluid flow 126 flow in generally the same axial direction.

Figure 5:
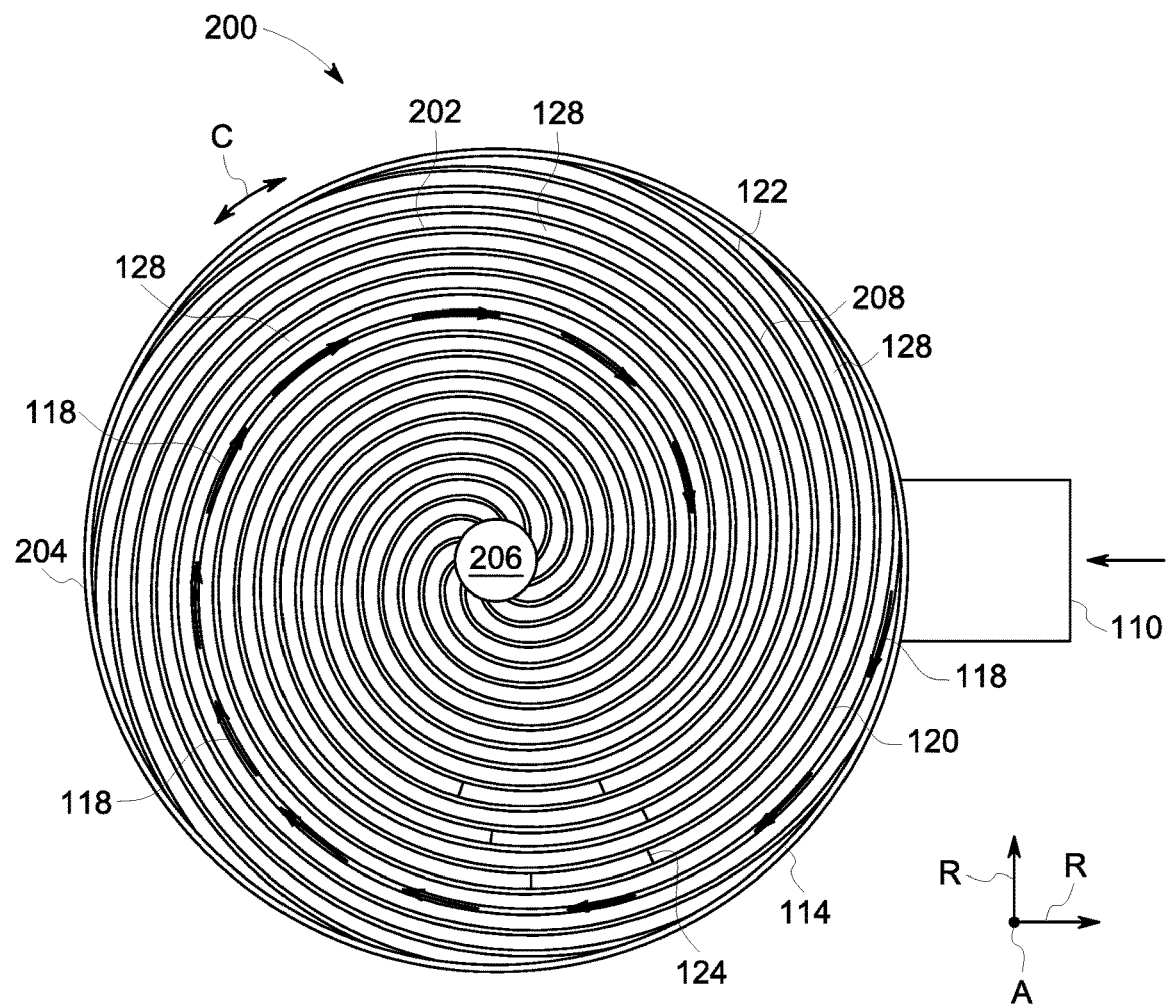
FIG. 5 provides a top view of another embodiment of heat exchange module, in accordance with one embodiment of the present disclosure.
Figure 6:
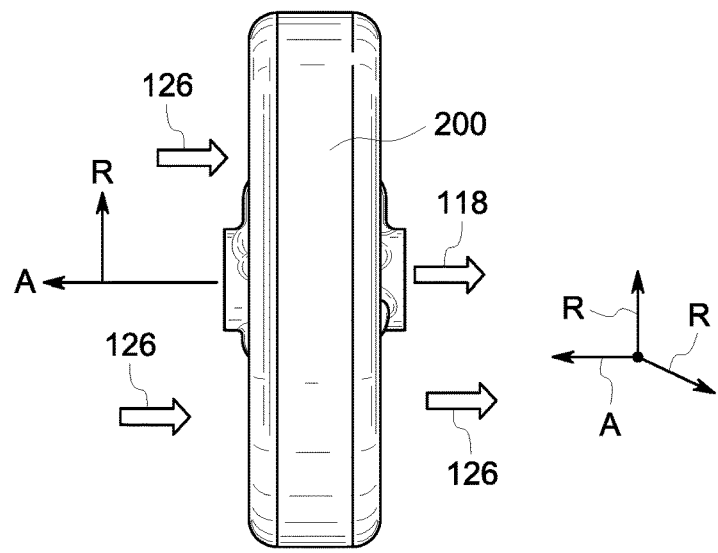
FIG. 6 provides a side view of the heat exchange module of FIG. 5, in accordance with one embodiment of the present disclosure.
Figure 7:
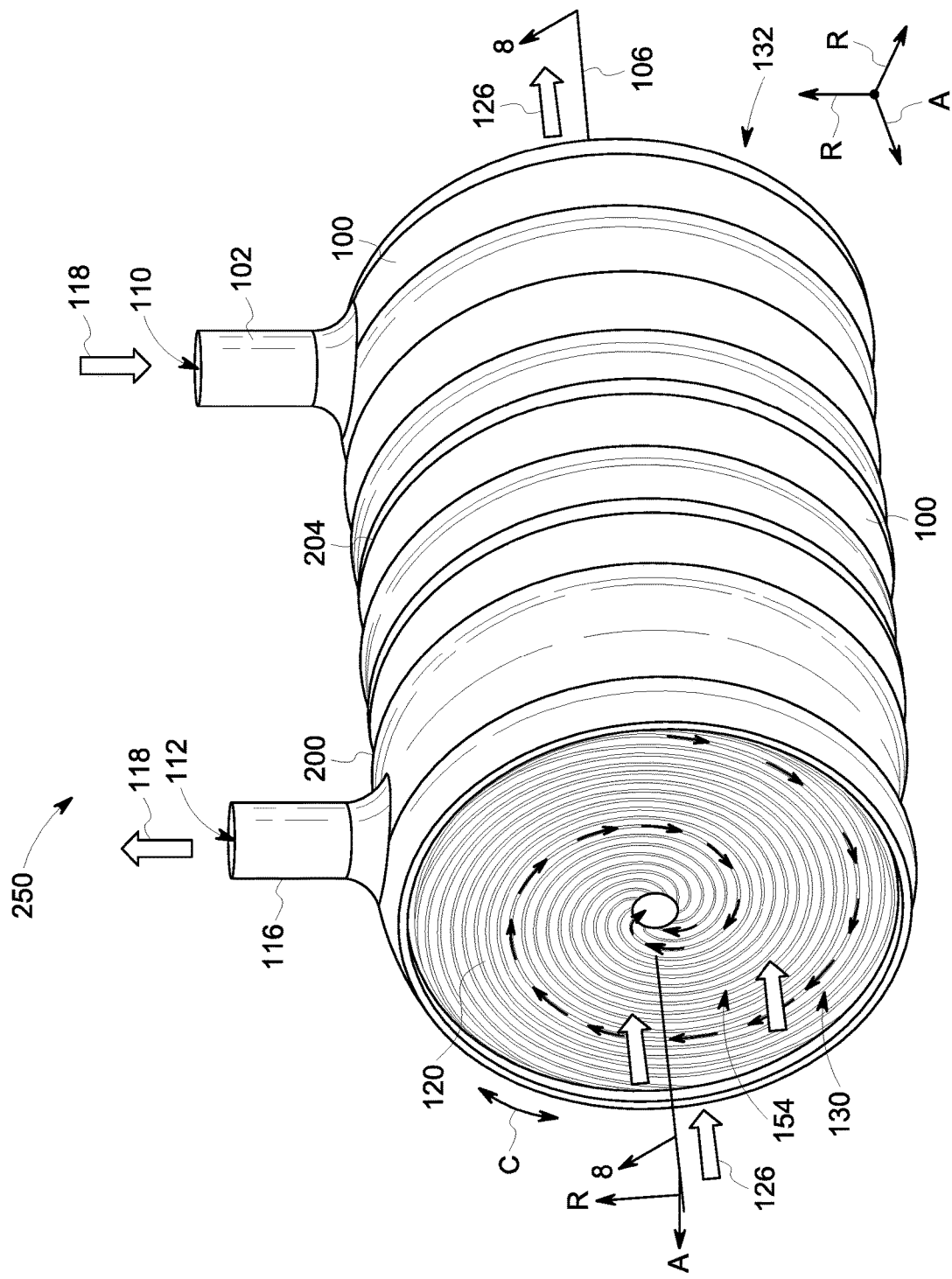
FIG. 7 provides an isometric view of a plurality of heat exchange modules of FIG. 5, in a stacked configuration to form a heat exchanger, in accordance with one embodiment of the present disclosure.
Figure 8:
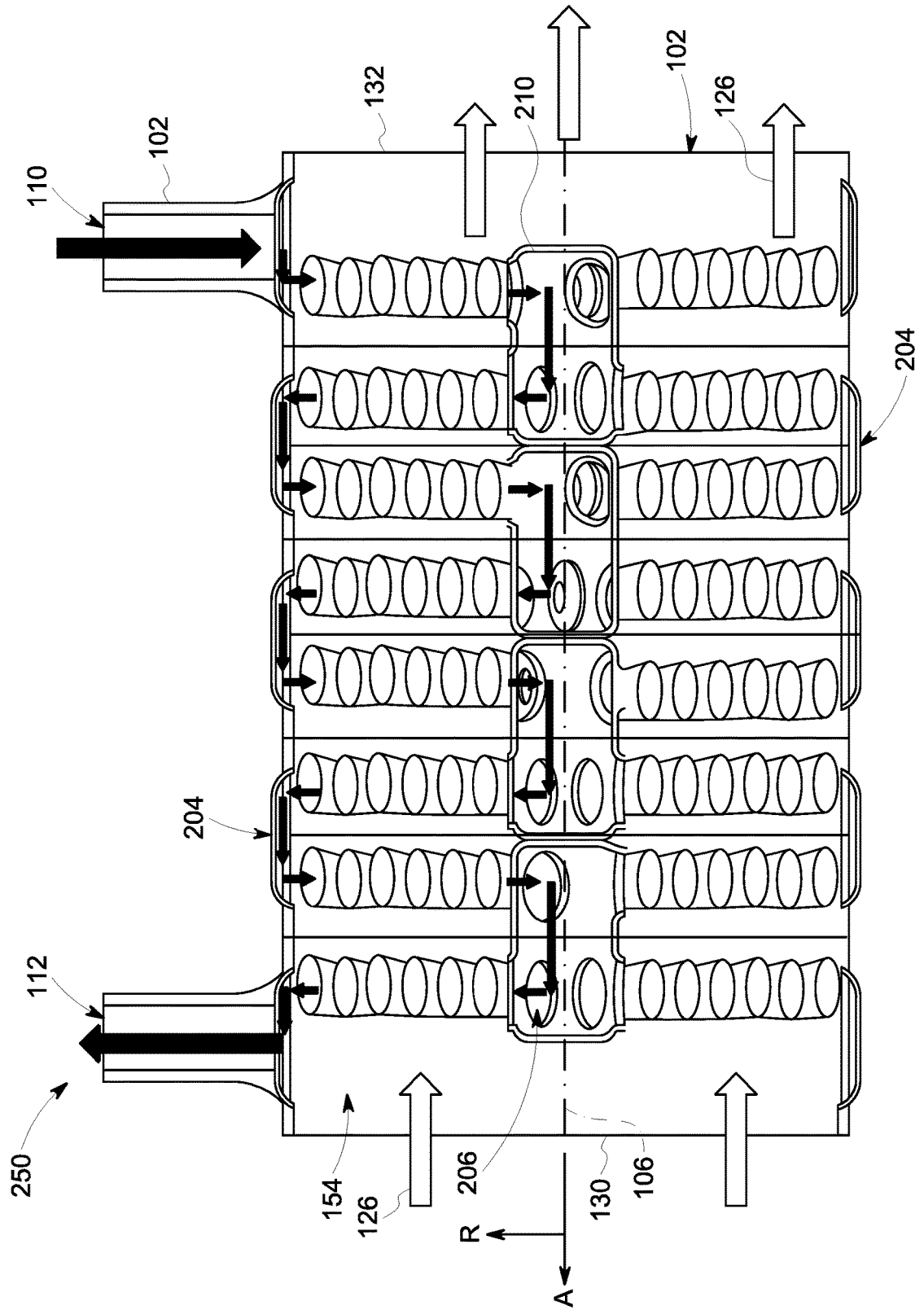
FIG. 8 illustrates an enlarged and partial, cross-sectional view of the heat exchanger of FIG. 7, in accordance with one embodiment of the present disclosure.
Figure 9:
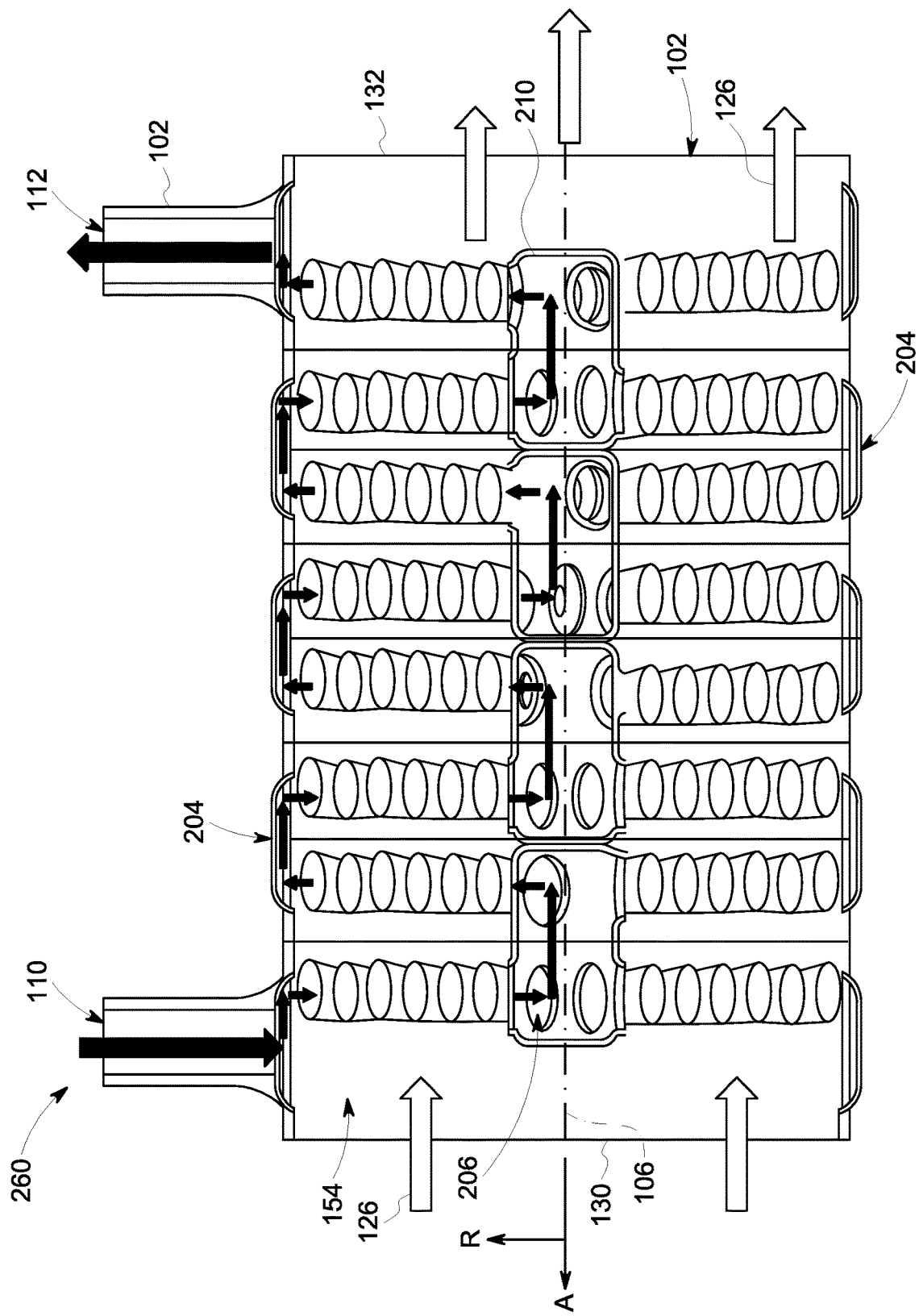
FIG. 9 illustrates an enlarged and partial, cross-sectional view of a fluid flow in another embodiment of a heat exchanger, in accordance with one embodiment of the present disclosure.

Referring now to FIGS. 5-9, a heat exchange module 200 will be described according to additional embodiments of the present subject matter. In this regard, FIG. 5 provides a front view of the heat exchange module 200. FIG. 6 illustrates a side view of the heat exchange module 200 of FIG. 5. FIG. 7 illustrates a plurality of the heat exchange modules 200 of FIG. 5, assembled in stacked configuration to form a heat exchanger 250. FIG. 8 illustrates a sectional view of the heat exchanger of FIG. 7 taken through line 8-8 of FIG. 7. FIG. 9 illustrates fluid flow in a sectional view of an alternate embodiment of the heat exchanger. As illustrated, the heat exchange module 200 generally defines an axial direction A, a radial direction R, and a circumferential direction C. Likewise, the heat exchanger 250 generally defines an axial direction A, a radial direction R, and a circumferential direction C. According to the illustrated embodiment, heat exchange module 200, and when in a stacked configuration, the heat exchanger 250, generally define a flow passageway 154, as best illustrated in FIG. 7, extending along the axial direction A. According to the illustrated embodiment, each of the one or more heat exchange modules 200 defines a circular cross section defining a central axis 106 that extends along the axial direction A. In this manner, the flow passageway 154 is an elongated cylinder and, similar to the previous embodiment, may be used to fit within or replace and existing pipe or circular conduit to facilitate a heat exchange process. However, it should be appreciated that according to alternative embodiments, the heat exchange module 100 may have any substantially curved closed geometry such as an ellipse, oval, Reuleaux or other curvelinear triangle, etc. For example, the heat exchange module 100 may have a non-circular cross section and may have a curved central axis 106 such that the heat exchange module 100 can fit in non-linear flow paths or conduits.

Heat exchanger 250 includes a plurality of heat exchange modules 200 in a stacked configuration to define the flow passageway 154 along the central axis 106, i.e., the axial direction A in the illustrated embodiment. Each heat exchange module 200 includes a first heat exchanging fluid inlet 110 in fluid communication with an adjacent upstream module 100 or a source of fluid (not shown). In addition, each heat exchange module 200 includes a first heat exchanging fluid outlet 112 in fluid communication with an adjacent downstream heat exchange module 100, or to discharge the first heat exchanging fluid flow 118 from the heat exchanger 250.

In this particular embodiment, the first heat exchanging fluid flow 118, such as high density fluid (e.g. oil), is routed from an outer radius of the heat exchange module 200 to an inner radius of the heat exchange module 200 through a plurality of equidistant heat exchange tubes 202 that are spaced such that a second heat exchanging fluid flow 126, such as a low density fluid (e.g. air) passes in a cross-flow direction to the first heat exchanging fluid flow 118 within the plurality of equidistant heat exchange tubes 202. The plurality of equidistant heat exchange tubes 202 define therein multiple spiral first heat exchanging fluid flow passages 208, such that a length of each spiral first heat exchanging fluid flow passages 208 is the same.

The first heat exchanging fluid flow 118 enters the heat exchange module 200 via the first heat exchanging fluid inlet 110 into a circular outer manifold 204 and is distributed to the plurality of spiral first heat exchanging fluid flow passages 208. The specific shape of each of the plurality of equidistant heat exchange tubes 202, and thus the multiple spiral first heat exchanging fluid flow passages 208, is an involute of a circle. The spiral first heat exchanging fluid flow passages 208 are in fluid communication with an internal tube or annulus, that acts as the outlet 112, in the form of a central manifold 206. The plurality of spiral first heat exchanging fluid flow passages 208 can be configured as a single flow passage through each of the plurality of equidistant heat exchange tubes 202, or multiple passages or other shapes internal to the plurality of equidistant heat exchange tubes 202. The plurality of equidistant heat exchange tubes 202 are spaced such that the hydraulic diameter of the second heat exchanging fluid flow 126 is the same at all locations in the fluid path 154. In an embodiment, a plurality of extended surface fins 124 may be included between the plurality of equidistant heat exchange tubes 202. The spacing and shape of the plurality of extended surface fins 124 are such that the second heat exchanging fluid flow 126, such as air, passing through the heat exchange module 200 in a cross-flow direction to the first heat exchanging fluid flow 118, has the same hydraulic diameter in each flow passage defined by the plurality of extended surface fins 124.

In combination, the plurality of equidistant heat exchange tubes 202 and spacing and shape of the plurality of extended surface fins 124 provide for the maintenance of a constant flow path and hydraulic diameter for each of the first heat exchanging fluid flow 118 and the second heat exchanging fluid flow 126. As previously stated with regard to the first disclosed embodiment, this enables a more compact and efficient design.

Referring more specifically to FIG. 5, as shown, each of the plurality of spiral first heat exchanging fluid flow passages 208 extends between the first heat exchanging fluid inlet 110, and more particularly the circular outer manifold 204, inward substantially along the radial direction R toward a central aperture or the outlet 112, and more particularly the central manifold 206.

Referring briefly to FIGS. 7 and 8, as shown, heat exchanger 250 comprises a plurality of heat exchange modules 200 stacked adjacent each other. In addition, heat exchanger 250 defines a plurality of bulkheads 210 defined between the central manifolds 206 of the heat exchange modules 200, e.g., to steer the first heat exchanging fluid flow 118 back into the plurality of equidistant heat exchange tubes 202. In this manner, the central manifolds 206 of the heat exchange modules 200 extend along the central axis 106 and are alternately separated by the plurality of bulkheads 210 along the axial direction A.

Similarly, as best illustrated in FIG. 8, the circular outer manifolds 204 are configured to bridge two adjacent heat exchange modules 200 to provide fluid communication between the two adjacent heat exchange modules 200. As illustrated, the heat exchange modules 200 extend through flow passageway 154 substantially along the radial direction R. When stacked adjacent to each other and coupled using the circular outer manifolds 204 and the plurality of bulkheads 210 as described herein, the first heat exchanging fluid flow 118 within each of the heat exchange modules 200 will flow through the plurality of equidistant heat exchange tubes 202.

The heat exchange modules 200 are positioned within the flow passageway 154 such that they are fluidly isolated from the flow passageway 154 but in thermal communication with the second heat exchanging fluid flow 126 flowing therein. An optional housing 102 may define the first heat exchanging fluid inlet 110 positioned upstream of the first heat exchange module 200, or inlet heat exchange module, and the first heat exchanging fluid outlet 112 positioned downstream of a last heat exchange module 200, or discharge heat exchange module. The first heat exchanging fluid flow 118 may flow through the first heat exchanging fluid inlet 110 of the inlet heat exchange module 200 and pass through the heat exchange modules 200 along the axial direction A until passing through the first heat exchanging fluid outlet 112 of the discharge module.

In addition, according to an exemplary embodiment, the heat exchanger 250, and more particularly the heat exchange modules 200, define a second heat exchanging fluid inlet 130 and a second heat exchanging fluid outlet 132. As illustrated, the second heat exchanging fluid inlet 130 is in fluid communication with the inlet heat exchange module 200 for providing the second heat exchanging fluid flow 126 to the inlet heat exchange module 200. The second heat exchanging fluid flow 126 passes through the heat exchange modules 200 before exiting the heat exchanger 250 through the discharge heat exchange module 200 and the second heat exchanging fluid outlet 132. Any suitable number of heat exchange modules 200 may be stacked along the central axis 106 and the second heat exchanging fluid inlet 130 and the second heat exchanging fluid outlet 132 may be spaced apart along the axial direction A to supply and receive the second heat exchanging fluid flow 126.

The heat exchange module 200 is described herein as passing the first heat exchanging fluid flow 118 substantially along the radial direction R and the second heat exchanging fluid flow 126 substantially along the axial direction A (i.e., perpendicular to the radial direction R). In this manner, the heat exchange module 200 is configured such that the flows are perpendicular to each other and in a cross-flow heat exchange arrangement. However, it should be appreciated that the directional orientation of the plurality of equidistant heat exchange tubes 202 relative to housing 102 and flow passageway 154 may vary while remaining within the scope of the present disclosure. As described in detail above, any suitable alternative heat exchanging fluids may be used.

Additionally, similar to the first embodiment, each successive heat exchange module 200 may be clocked to steer and/or interrupt the second heat exchanging fluid flow 126 along the axial direction A through the flow passageway 154. By contrast, according to still another embodiment, the heat exchange modules 200 may be uniformly oriented along the axial direction A, e.g., to reduce flow losses and pressure drop within flow passageway 154.

In an alternate embodiment of the heat exchanger, generally referenced 160, as illustrated in FIG. 9, one of the relative fluid directions of the first heat exchanging fluid flow 118 or the second heat exchanging fluid flow 126 can be reversed from that illustrated in FIG. 7, resulting in a different flow configuration that is of use. This type of flow configuration results in a co-flow heat exchanger as illustrated in FIG. 9, wherein the first heat exchanging fluid flow 118 or the second heat exchanging fluid flow 126 flow in generally the same axial direction.

In the previously disclosed embodiments, the heat exchange tubes 120, 202 may be formed of aluminum, titanium 6-4, Inconel 718, or a cobalt chrome alloy. Other materials may be used as well if they have similar and/or satisfactory performance attributes. In addition, the heat exchange tubes 120, 202 may be any suitable size and shape, within the parameters defined for obtaining constant flow pressures, for facilitating improved heat transfer while minimizing pressure losses within the first and second heat exchanging fluid flows 118, 126. For example, according to the illustrated embodiments, the heat exchange tubes 120, 202 have a substantially circular cross sectional profile. However, according to alternative embodiments, any other suitable cross sectional shape may be used, such as an elliptical cross section or even a varying or undulating cross sectional shape. For example, the cross section could be airfoil-shaped (e.g., similar to the shape of a teardrop). The heat exchange tubes 120, 202 may be formed in any suitable size, number, spacing, and shape depending on the application and the type of heat exchanging fluid. These various configurations are enabled by the additive manufacturing processes disclosed herein and are considered to be within the scope of the present subject matter.

Although exemplary embodiments are described herein, it should be appreciated that heat exchange tubes 120, 202 may be configured in any suitable manner depending on the application, the types of heat exchanging fluids being used, space considerations, etc. In addition, each heat exchange module 100, 200 may include a slightly different structure or may include heat exchange tubes 120, 202 that are offset from each other along the axial direction A to maximize contact between heat exchange tubes 120, 202 and the second heat exchanging fluid flow 126.

The various portions of heat exchange modules 100, 200 may be constructed using any suitable material, in any suitable geometry, density, and thickness, as needed to provide necessary structural support to the heat exchanger 150, 160, 250, 260. For example, the optional housing 102 of the heat exchange module 200 may be formed from a rigid, thermally insulating material. In addition, the housing 102 may be thicker and denser to provide structural support for loads experienced by heat exchange modules 200 during mounting, assembly, and operation. In addition, heat exchange module 100 may include a housing as described with reference to heat exchange module 200. By contrast, heat exchange tubes 120, 202 may be thinner and constructed of a more thermally conductive material in order to enhance heat transfer. For example, heat exchange tubes 120, 202 may have a wall thickness of 20 µm or any other suitable thickness.

Now that the construction and configuration of heat exchange modules 100, 200 according to the exemplary embodiments of the present subject matter have been presented, an exemplary method 300 for forming a heat exchanger according to an exemplary embodiment of the present subject matter is provided. Method 300 can be used by a manufacturer to form heat exchanger 150, 160, 250, 260, or any other suitable heat exchanger. It should be appreciated that the exemplary method 300 is discussed herein only to describe exemplary aspects of the present subject matter, and is not intended to be limiting.

Figure 10:
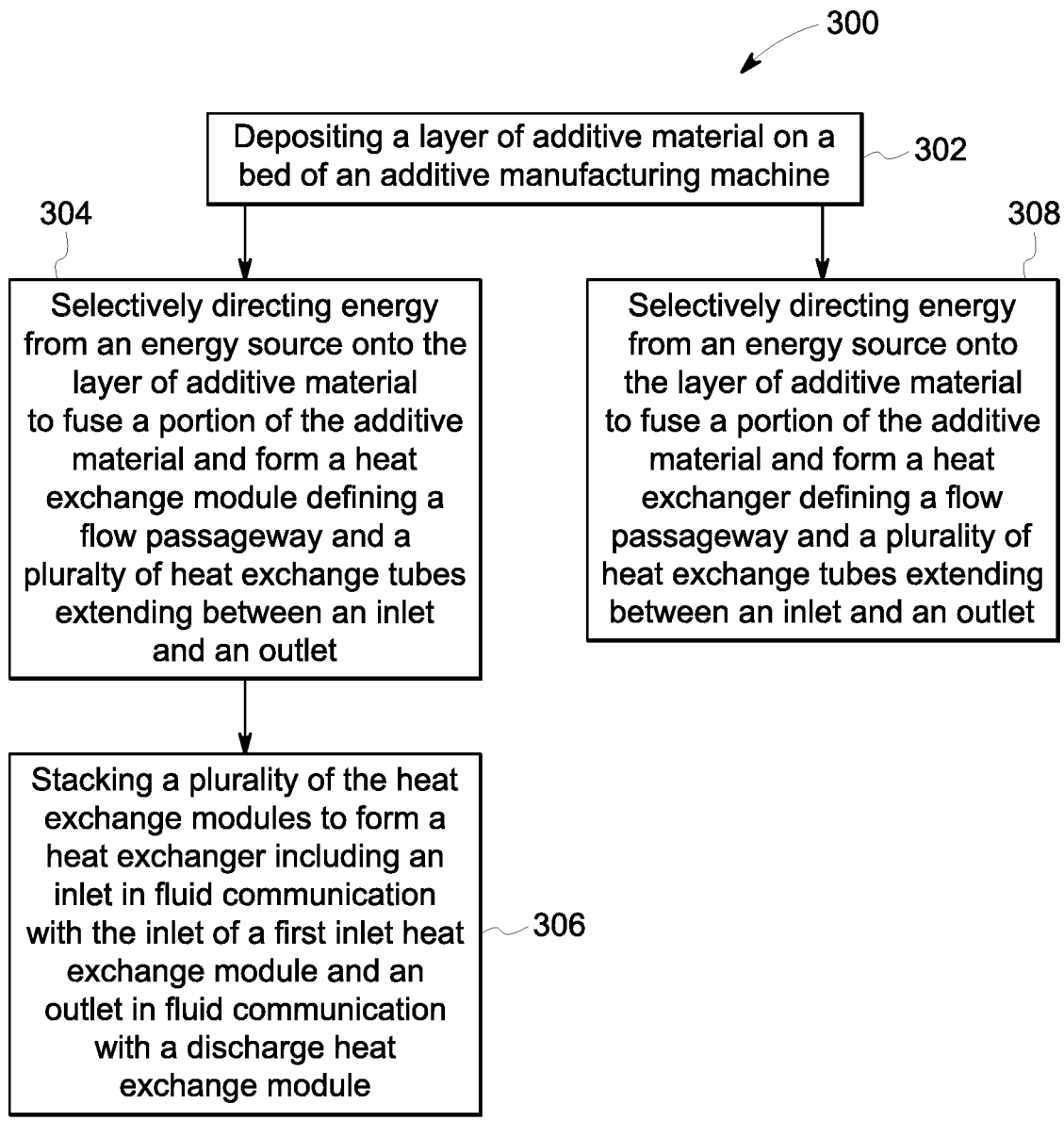
FIG. 10 is a method of manufacturing a heat exchanger, in accordance with one embodiment of the present disclosure.

Referring now to FIG. 10, method 300 includes, at step 302, depositing a layer of additive material on a bed of an additive manufacturing machine. Method 300 further includes, at step 304, selectively directing energy from an energy source onto the layer of additive material to fuse a portion of the additive material and form the heat exchange module 100, 200 defining a flow passageway and a plurality of heat exchange tubes extending between an inlet and an outlet. For example, using the example from above, heat exchange module 100, 200 may be formed for transferring heat between to streams of air, between streams of air and oil, or any other suitable heat exchanger may be formed. The method further includes, at step 306, stacking a plurality of the heat exchange modules 100, 200 to form a heat exchanger 150, 160, 250, 260, including an inlet in fluid communication with the inlet of a first inlet heat exchange module and an outlet in fluid communication with a discharge heat exchange module.

According to exemplary embodiments, method 300 may further include using the additive manufacturing methods described herein to form an integral inlet manifold and an integral outlet manifold. Notably, according to an exemplary embodiment, the plurality of heat exchange modules, the inlet manifolds, the outlet manifolds, the heat exchange tubes, and other parts of the heat exchanger such as described above are integrally formed as a single monolithic component. Accordingly, in an alternate method, the complete heat exchanger 150, 160, 250, 260 is formed, at step 308, by selectively directing energy from an energy source onto the layer of additive material, deposited in step 302, to fuse a portion of the additive material and form a complete heat exchanger 150, 160, 250, 260 defining a flow passageway and a plurality of heat exchange tubes extending between an inlet and an outlet as a monolithic component.

FIG. 10 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using heat exchange module 100 and heat exchanger 150, as an example, it should be appreciated that these methods may be applied to manufacture heat exchange module 200, heat exchanger 160, 250, 260 and any suitable heat exchanger.

It should be appreciated that heat exchange modules 100, 200 and the heat exchangers 150, 160, 250, 260 are described herein only for the purpose of explaining aspects of the present subject matter. For example, the heat exchange modules 100, 200 will be used herein to describe exemplary configurations, constructions, and methods of manufacturing the heat exchangers 150, 160, 250, 260. It should be appreciated that the additive manufacturing techniques discussed herein may be used to manufacture other heat exchangers for use in any suitable device, for any suitable purpose, and in any suitable industry. Thus, the exemplary components and methods described herein are used only to illustrate exemplary aspects of the present subject matter and are not intended to limit the scope of the present disclosure in any manner.

An additively manufactured heat exchanger and a method for manufacturing that heat exchanger are described above. Notably, the heat exchange module 100, 200 may generally be intended to fit within or replace an existing pipe or conduit to facilitate a heat exchange process. The heat exchange module 100, 200 may include performance-enhancing geometries and heat exchanging features whose practical implementations are facilitated by an additive manufacturing process, as described below. For example, using the additive manufacturing methods described herein, the heat exchanger may include heat exchange modules defining first and second heat exchange flow passages for transferring thermal energy between two streams of fluid, wherein the defined flow passages provide a constant flow path and hydraulic diameter for each of the two fluids, thereby reducing flow losses and pressure drops within the flow passageways. In addition, the additive manufacturing techniques described herein enable the formation of a heat exchanger with integral inlet and outlet manifolds and heat exchange tubes designed to improve the thermal efficiency of the heat exchanger. These features may be introduced during the design of the heat exchanger, such that they may be easily integrated into heat exchanger during the build process at little or no additional cost. Moreover, the entire heat exchanger, including the heat exchange modules, and all other features can be formed integrally as a single monolithic component.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A heat exchange module defining an axial direction and comprising:
   a first heat exchanging fluid inlet;
   a first heat exchanging fluid outlet; and
   a plurality of heat exchange tubes fluidly coupling the first heat exchanging fluid inlet and the first heat exchanging fluid outlet,
   wherein the plurality of heat exchange tubes define a plurality of first heat exchanging fluid flow passages of equal length and a plurality of second heat exchanging fluid flow passages of equal hydraulic diameter,
   wherein the heat exchange module defines a substantially curved closed geometry defining a perimeter and a central axis that extends along the axial direction,
   wherein the plurality of heat exchange tubes comprises a first heat exchange tube, a second heat exchange tube adjacent to the first heat exchange tube, and a third heat exchange tube adjacent to the second heat exchange tube,
   wherein one of the plurality of second heat exchanging fluid flow passages is formed between the first heat exchange tube and the second heat exchange tube such that, in a plane perpendicular to the axial direction, the first heat exchange tube and the second heat exchange tube contact at opposite ends of the one of the plurality of second heat exchanging fluid flow passages,
   wherein another of the plurality of second heat exchanging fluid flow passages is formed between the second heat exchange tube and the third heat exchange tube such that, in the plane perpendicular to the axial direction, the second heat exchange tube and the third heat exchange tube contact at opposite ends of the another of the plurality of second heat exchanging fluid flow passages,
   wherein, in the plane perpendicular to the axial direction, each of the first heat exchange tube, the second heat exchange tube, and the third heat exchange tube have a first terminal end and a second terminal end at the perimeter of the heat exchange module, and
   wherein both the one and the another of the plurality of second heat exchanging fluid flow passages have the equal hydraulic diameter.

2. The heat exchange module as claimed in claim 1, wherein the plurality of heat exchange tubes maintain a substantially equal distance between adjacent heat exchange tubes of the plurality of heat exchange tubes, and wherein each of the plurality of first heat exchanging fluid flow passages is adjacent to one of the plurality of second heat exchanging fluid flow passages.

3. The heat exchange module as claimed in claim 1, wherein the plurality of heat exchange tubes extend radially outward in a spiral pattern to define a plurality of spiral first heat exchanging fluid flow passages.

4. The heat exchange module as claimed in claim 3, wherein the plurality of spiral first heat exchanging fluid flow passages extend from an outer circular inlet manifold to a central outlet manifold.

5. The heat exchange module as claimed in claim 1, wherein the plurality of heat exchange tubes are "S" shaped and extend from an arc shaped inlet manifold to an arc shaped outlet manifold on an opposed side of the heat exchange module.

6. The heat exchange module as claimed in claim 5, wherein the arc shaped inlet manifold is fluidly coupled to each of the plurality of heat exchange tubes and wherein the arc shaped outlet manifold is fluidly coupled to each of the plurality of heat exchange tubes.

7. The heat exchange module as claimed in claim 1, wherein the plurality of first heat exchanging fluid flow passages are one of single flow passages or multi-flow passages.

8. The heat exchange module as claimed in claim 1, further comprising a plurality of surface extending fins disposed between the plurality of heat exchange tubes and further defining the plurality of second heat exchanging fluid flow passages of equal hydraulic diameter.

9. The heat exchange module as claimed in claim 1, wherein the heat exchange module comprises a plurality of layers formed by:
   depositing a layer of additive material on a bed of an additive manufacturing machine; and selectively directing energy from an energy source onto the layer of additive material to fuse a portion of the additive material.

10. A heat exchanger defining an axial direction, a radial direction, and a circumferential direction, the heat exchanger comprising:
a plurality of heat exchange modules stacked along the axial direction to define a flow passageway,
wherein each of the plurality of heat exchange modules has a substantially a substantially curved closed geometry defining a perimeter and a central axis that extends along the axial direction,
wherein each of the plurality of heat exchange modules comprises:
a first heat exchanging fluid inlet;
a first heat exchanging fluid outlet; and
a plurality of heat exchange tubes fluidly coupling the first heat exchanging fluid inlet and the first heat exchanging fluid outlet,
wherein the plurality of heat exchange tubes define a plurality of first heat exchanging fluid flow passages of equal length and a plurality of second heat exchanging fluid flow passages of equal hydraulic diameter,
wherein the plurality of heat exchange tubes comprises a first heat exchange tube, a second heat exchange tube adjacent to the first heat exchange tube, and a third heat exchange tube adjacent to the second heat exchange tube,
wherein one of the plurality of second heat exchanging fluid flow passages is formed between the first heat exchange tube and the second heat exchange tube such that, in a plane perpendicular to the axial direction, the first heat exchange tube and the second heat exchange tube contact at opposite ends of the one of the plurality of second heat exchanging fluid flow passages,
wherein another of the plurality of second heat exchanging fluid flow passages is formed between the second heat exchange tube and the third heat exchange tube such that, in the plane perpendicular to the axial direction, the second heat exchange tube and the third heat exchange tube contact at opposite ends of the another of the plurality of second heat exchanging fluid flow passages,
wherein, in the plane perpendicular to the axial direction, each of the first heat exchange tube, the second heat exchange tube, and the third heat exchange tube have a first terminal end and a second terminal end at the perimeter of the heat exchange module, and
wherein both the one and the another of the plurality of second heat exchanging fluid flow passages have the equal hydraulic diameter.

11. The heat exchanger as claimed in claim 10,
wherein one of the plurality of heat exchange modules is an inlet heat exchange module and one of the plurality of heat exchange modules is a discharge heat exchange module,
wherein, for each of the plurality of heat exchange modules, the plurality of heat exchange tubes maintain a substantially equal distance between adjacent heat exchange tubes of the plurality of heat exchange tubes, and
wherein, for each of the plurality of heat exchange modules, each of the plurality of first heat exchanging fluid flow passages is adjacent to one of the plurality of second heat exchanging fluid flow passages.

12. The heat exchanger as claimed in claim 10, wherein each of the plurality of heat exchange tubes extend radially outward in a spiral pattern to define a plurality of spiral first heat exchanging fluid flow passages extending from an outer circular inlet manifold to a central outlet manifold extending along the central axis in the axial direction.

13. The heat exchanger as claimed in claim 10, wherein, for each of the plurality of heat exchange modules, the plurality of heat exchange tubes are "S" shaped to define a plurality of "S" shaped first heat exchanging fluid flow passages extending from an arc shaped inlet manifold to an arc shaped outlet manifold on an opposed side of each of the heat exchange modules.

14. The heat exchanger as claimed in claim 10, wherein, for each of the plurality of heat exchange modules, the plurality of first heat exchanging fluid flow passages are one of single flow passages or multi-flow passages.

15. The heat exchanger as claimed in claim 10, wherein each of the plurality of heat exchange modules further comprises a plurality of surface extending fins disposed between the plurality of heat exchange tubes and further defining the plurality of second heat exchanging fluid flow passages of equal hydraulic diameter.

16. The heat exchanger as claimed in claim 10, wherein, for each of the plurality of heat exchange modules, the first heat exchanging fluid inlet and the first heat exchanging fluid outlet are spaced apart along the axial direction.

17. The heat exchanger as claimed in claim 10, wherein, for each of the plurality of heat exchange modules, each of the plurality of heat exchange tubes defines an elliptical, circular, or airfoil cross section.

18. The heat exchanger as claimed in claim 10, wherein the plurality of heat exchange modules comprises at least three heat exchange modules.

19. The heat exchanger as claimed in claim 10, wherein an annular outer manifold bridges two adjacent heat exchange modules to provide fluid communication between the two adjacent heat exchange modules.

20. The heat exchanger as claimed in claim 10, wherein the plurality of heat exchange modules are integrally formed as a single monolithic component.

21. The heat exchanger as claimed in claim 10, wherein the heat exchanger comprises a plurality of layers formed by:
depositing a layer of additive material on a bed of an additive manufacturing machine; and
selectively directing energy from an energy source onto the layer of additive material to fuse a portion of the additive material.

22. A method of manufacturing a heat exchanger, the method comprising:
depositing a layer of additive material on a bed of an additive manufacturing machine; and
selectively directing energy from an energy source onto the layer of additive material to fuse a portion of the additive material and form the heat exchanger,
wherein the heat exchanger defines an axial direction, a radial direction, and a circumferential direction, and comprises:
a plurality of heat exchange modules stacked along the axial direction to define a flow passageway, each of the plurality of heat exchange modules having a substantially curved closed geometry defining a central axis that extends along the axial direction, each of the plurality of heat exchange modules comprising:
a first heat exchanging fluid inlet;
a first heat exchanging fluid outlet; and a plurality of heat exchange tubes fluidly coupling the first heat exchanging fluid inlet and the first heat exchanging fluid outlet, wherein the plurality of heat exchange tubes defining a plurality of first heat exchanging fluid flow passages of equal length and a plurality of second heat exchanging fluid flow passages of equal hydraulic diameter, wherein the plurality of heat exchange tubes comprises a first heat exchange tube, a second heat exchange tube adjacent to the first heat exchange tube, and a third heat exchange tube adjacent to the second heat exchange tube, wherein one of the plurality of second heat exchanging fluid flow passages is formed between the first heat exchange tube and the second heat exchange tube such that, in a plane perpendicular to the axial direction, the first heat exchange tube and the second heat exchange tube contact at opposite ends of the one of the plurality of second heat exchanging fluid flow passages, wherein another of the plurality of second heat exchanging fluid flow passages is formed between the second heat exchange tube and the third heat exchange tube such that, in the plane perpendicular to the axial direction, the second heat exchange tube and the third heat exchange tube contact at opposite ends of the another of the plurality of second heat exchanging fluid flow passages, wherein, in the plane perpendicular to the axial direction, each of the first heat exchange tube, the second heat exchange tube, and the third heat exchange tube have a first terminal end and a second terminal end at a perimeter of the heat exchange module, and wherein both the one and the another of the plurality of second heat exchanging fluid flow passages have the equal hydraulic diameter.

23. The method as claimed in claim 22, wherein the plurality of heat exchange modules is integrally formed as a single monolithic component.

24. The heat exchange module as claimed in claim 1, wherein the first heat exchange tube, the second heat exchange tube, and the third heat exchange tube have equal lengths and are differently shaped from each other.

* * * * *